United States Patent [19]
Fuchs et al.

[11] 3,873,540
[45] Mar. 25, 1975

[54] 1,3,5-TRIAZINEDIONES

[75] Inventors: Julius Jakob Fuchs, Wilmington; Kang Lin, Newark, both of Del.

[73] Assignee: E. I. du Pont de Nemours and Company, Wilmington, Del.

[22] Filed: Apr. 5, 1973

[21] Appl. No.: 348,322

Related U.S. Application Data

[63] Continuation-in-part of Ser. No. 325,358, Jan. 22, 1973, abandoned.

[52] U.S. Cl. .............................. 260/248 NS, 71/93
[51] Int. Cl. .......................................... C07d 55/50
[58] Field of Search ............................ 260/248 NS

[56] References Cited
UNITED STATES PATENTS
3,505,057   4/1970   Luckenbaugh .................... 260/248

FOREIGN PATENTS OR APPLICATIONS
1,083,752   9/1967   United Kingdom
1,912,226   11/1970   Germany

*Primary Examiner*—John M. Ford

[57] ABSTRACT

Herbicidal 1,3,5-triazinediones of the formula:

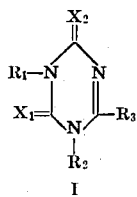

I wherein $X_1$, $X_2$, $R_1$, $R_2$ and $R_3$ are as hereinafter defined. Certain of these triazinediones are useful for the selective control of weeds in crops, e.g. wheat and soybeans.

Exemplary of the class of compounds are 1-methyl-2-cyclopentyl-6-methylthio-s-triazine-2,4(1H,3H)-dione and 1-methyl-3-cyclohexyl-6-methylthio-s-triazine-2,4(1H,3H)-dione, which are useful for the selective control of weeds in wheat and soybeans, respectively.

11 Claims, No Drawings

3,873,540

1,3,5-TRIAZINEDIONES

CROSS-REFERENCE TO RELATED APPLICATION

This application is a continuation-in-part of our copending U.S. Pat. application. Ser. No. 325,358, filed Jan. 22, 1973, now abandoned.

BACKGROUND OF THE INVENTION

Neumayer et al., "Pesticides," *Chemical Week*, Apr. 12 and 26, 1969, lists several commercial and experimental s-triazine herbicides. Among these are prometone and prometryne, which have the structural formulae:

prometone    prometryne

These and related compounds are disclosed in U.S. Pat. No. 2,909,420.

Copending U.S. Pat. application Ser. No. 301,853, filed Oct. 30, 1972 by the inventors herein, Julius J. Fuchs and Kang Lin, (which is a continuation-in-part of U.S. Pat. application Ser. No. 268.767, filed July 3, 1972, now abandoned, which is in turn a continuation-in-part of U.S. Pat. application Ser. No. 181,202, filed Sept. 16, 1971, now abandoned) discloses a class of 1,3,5-triazinediones of the general formula where R' represents hydrogen or certain organic radicals, the R"s represent certain organic radicals and the X s represent oxygen or sulfur. These compounds are disclosed as being useful as selective herbicides.

The compounds of the above-mentioned copending application are intermediates in the preparation of the novel and highly active class of herbicides of the present invention.

SUMMARY OF THE INVENTION

This invention is a class of novel herbicidally active compounds of the formula:

I wherein $R_1$ is alkyl of 3 through 8 carbon atoms, cycloalkyl of 3 through 8 carbon atoms, methylcyclopentyl, methylcyclohexyl, dimethylcyclohexyl, trimethylcyclohexyl, tetramethylcyclohexyl, cycloalkylalkyl of 4 through 7 carbon atoms, alkenyl of 3 through 4 carbon atoms, alkynyl of 3 through 4 carbon atoms, benzyl or where
  Y is hydrogen, halogen, alkyl of 1 through 4 carbon atoms, nitro, alkoxy of 1 through 4 carbon atoms, alkylthio of 1 through 4 carbon atoms, cyano, or trifluoromethyl,
  Z is hydrogen, halogen, methyl, ethyl, nitro, alkoxy of 1 through 4 carbon atoms, or alkylthio of 1 through 4 carbon atoms, and Q is hydrogen, halogen, or methyl;
$R_2$ is alkyl of 1 through 4 carbon atoms;
$R_3$ is $SR_4$ or $OR_4$, where
  $R_4$ is alkyl of 1 through 6 carbon atoms, cycloalkyl of 3 through 6 carbon atoms, alkenyl of 3 through 4 carbon atoms, alkynyl of 3 through 4 carbon atoms, or benzyl, and
$X_1$ and $X_2$ are each independently selected from oxygen or sulfur.

The invention also includes herbicidal compositions containing the above compounds as active ingredient and and method of controlling undesired vegetation, including undesired vegetation in crops such as wheat and soybeans, by applying the compounds and/or compositions.

DESCRIPTION OF THE INVENTION

Preferred Compounds

Certain of the compounds of Formula I are preferred because of their higher herbicidal activity and their ease of synthesis. These include compounds of Formula I where:

$R_1$ is alkyl of 3 through 6 carbon atoms or cycloalkyl of 5 through 8 carbon atoms;
$R_2$ is methyl;
$R_3$ is $SR_4$ or $OR_4$;
$R_4$ is alkyl of 1 through 6 carbon atoms or alkenyl of 3 through 4 carbon atoms; and
$X_1$ and $X_2$ are oxygen.

More preferred because of their highest herbicidal activity and selectivity are those compounds of Formula I where:

$R_1$ is alkyl of 3 through 4 carbon atoms or cycloalkyl of 5 through 7 carbon atoms;
$R_2$ is methyl;
$R_3$ is $SCH_3$, $SC_2H_5$, $OCH_3$ or $OC_2H_5$; and
$X_1$ and $X_2$ are oxygen.

Preferred herbicidal compounds of the above formula include:

1-methyl-3-cyclopentyl-6-methylthio-s-triazine-2,4-(1H,3H)-dione 1-methyl-3-cyclohexyl-6-methylthio-s-triazine-2,4-(1H,3H)-dione 1-methyl-3-isopropyl-6-methylthio-s-triazine-2,4-(1H,3H)-dione 1-methyl-3-tert-butyl-6-methylthio-s-triazine-2,4-(1H,3H)-dione 1-methyl-3-cyclopentyl-6-ethylthio-s-triazine-2,4-(1H,3H)-dione 1-methyl-3-cyclohexyl-6-ethylthio-s-triazine-2,4-(1H,3H)-dione 1-methyl-3-cyclopentyl-6-methoxy-s-triazine-2,4-(1H,3H)-dione 1-methyl-3-cyclopentyl-6-ethoxy-s-triazine-2,4(1H,3H)-dione Synthesis of the Compounds The compounds of Formula I where $X_1 = X_2 =$ oxygen can be prepared by the process illustrated by the following equations:

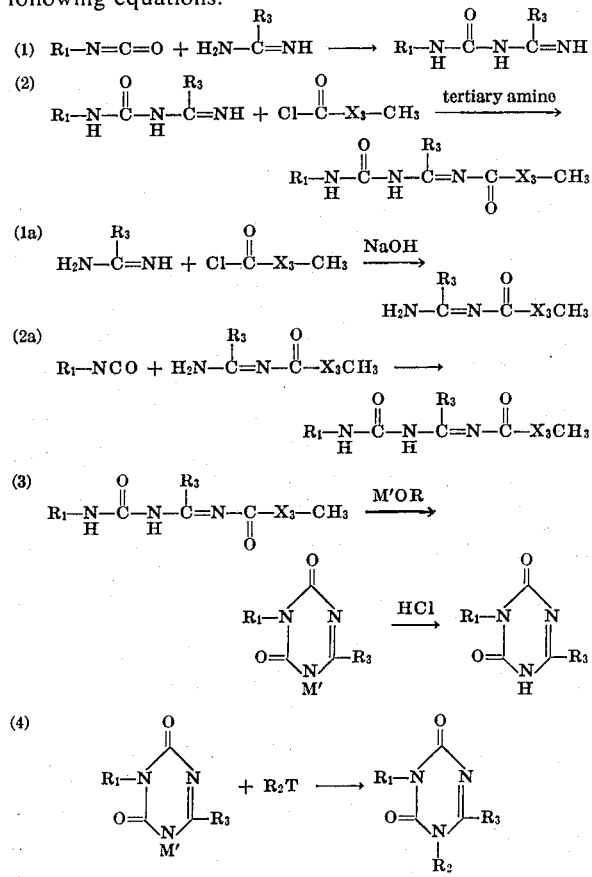

where:

$R_1$, $R_2$, and $R_3$ are as previously defined;

$X_3$ is oxygen or sulfur;

M' is an alkali metal, and

R is hydrogen or alkyl of 1 through 4 carbon atoms.

The synthesis of 1-thioallophanimidates and 1,3-dithioallophanimidates from thiopseudourea [equation 1)] are performed analogous to a procedure given in Organic Synthesis 42, 87 (1962), which describes the preparation of methyl 4-phenyl-3-thioallophanimidate (1-phenyl-2-thio-4-methylisobiuret).

The reaction products of equation (1) are allowed to react at about 0–45°C and atmospheric pressure in an inert organic solvent, e.g., methylene chloride, with one equivalent of a chloroformate or a chlorothiolformate in the presence of one equivalent of an acid acceptor such as triethylamine, trimethylamine or dimethylaniline [equation 2)]. After the completion of the reaction, the methylene chloride solution is washed with water, dried, and the solvent evaporated to give alkoxycarbonylthioallophanimidates, alkylthiolcarbonylthioallophanimidates, alkoxycarbonylallophanimidates and alkylthiolcarbonylallophanimidates.

The reaction products of equation(2) are also obtained by reacting the pseudourea or thiopseudourea first with a chloroformate or a chlorothiolformate as in equation (1a), and then reacting the reaction products of equation (1a) with an isocyanate as in equation (2a).

The reaction products of equation (2) are then refluxed for a short time with an alkali metal alkoxide or hydroxide such as sodium or potassium methoxide or hydroxide in methanol to effect cyclization [equation 3)]. The solvent is evaporated under vacuum; the residue is washed with ether or dissolved in water and acidified. Acidification of the aqueous solution usually precipitates the desired s-triazinedione as an essentially pure solid. If the desired compound does not precipitate upon acidification, it is extracted into methylene chloride. The solvent is then evaporated and the dried residue is recrystallized. The essentially pure alkali metal salt (corresponding to the alkali metal in the alkoxide or hydroxide) is obtained by washing the residue with ether and filtering the resulting solid. The same alkali metal salts are also obtained by dissolving the s-triazinediones in methanol containing one equivalent of alkali metal alkoxide or hydroxide such as sodium methoxide or hydroxide followed by evaporation of methanol. The alkali metal salts of s-triazinediones react with alkyl halides, sulfates, or tosylates to provide the 1-alkyl analogs of the this invention [equation 4)]. Both components are refluxed at about 50°–153°C in an appropriate inert organic solvent such as tetrahydrofuran, dimethylformamide, or acetonitrile for 5–10 hours. The solvent is evaporated and the residue dissolved in methylene chloride. The methylene chloride solution is washed with water, dried and evaporated to provide the 1-alkyl analogs of this invention in an essentially pure state.

The compounds of Formula I can also be prepared by the process illustrated by the following equations:

The synthesis of 1,2-dialkylpseudourea or 1,2-dialkyl-2-thiopseudourea are performed by a process analogous to the procedure given in J. Chem. Soc. 3551 (1955). The pseudourea is reacted with an isocyanate or an isothiocyanate as in equation (1). The reaction product of equation (5) is reacted with phosgene or thiophosgene at about 0°–100°C in the presence of a base such as triethylamine or N,N-dimethylaniline to give the s-triazine-2,4(1H,3H)-diones, thio-s-triazine-2,4(1H,3H)-diones and s-triazines-2,4(1H,3H)-dithiones of the present invention.

The s-triazine-4-thio-2,4(1H, 3H)-diones and s-triazine-2,4(1H,3H)-dithiones of the present invention can also be prepared by the process illustrated by the following equation:

(7)
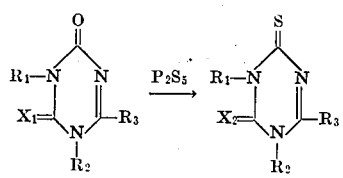

A s-triazine-2,4(1H,3H)-dione is reacted with phosphorus pentasulfide at about 25°–125°C in a solvent such as pyridine to produce the desired s-triazine-4-thio-2,4(1H,3H)-dione. The solvent is removed by evaporation and the residue recrystallized in a solvent such as benzene.

Formulation and Use of the Compounds

The compounds of the present invention are useful herbicides. Certain of these compounds can be used for the control of weeds in crops, such as wheat and soybeans, without injury to such crops.

The compounds can be applied preemergence, as a directed postemergence treatment or in certain specific cases as an overall postemergence treatment. Application rates range from ¼ to 10 kilograms/hectare. Method and rate of application depend upon such factors as crop, soil type, climatic condition, and weed population. Uniform distribution of the compounds is important.

These compounds may also be combined with other herbicides such as linuron, terbutryn, diuron, terbacil, and paraquat to control a broader spectrum of weeds.

The compounds of Formula I can be formulated in the various ways which are conventional for herbicides of similar physical properties. Useful formulations include wettable and soluble powders, oil suspensions and solutions, aqueous dispersions, dusts, granules, pellets, and high strength compositions. Broadly speaking, these formulations consist essentially of about 1 to 99% by weight of herbicidally active material (including at least one compound of Formula I in a herbicidally effective amount) and at least one of (a) about 0.1 to 20% by weight of surface active agent and (b) about 5 to 99% by weight of essentially biologically inert solid or liquid diluent. More specifically, the various types of formulations will generally contain these ingredients in the following approximate proportions.

|  | Percent by Weight | | |
|---|---|---|---|
|  | Herbicide | Diluent | Surfactant |
| Wettable Powders | 25 — 90 | 0 — 74 | 1 — 10 |
| Oil Suspensions or Solutions | .5 — 35 | 55 — 94 | 1 — 10 |
| Aqueous Dispersions | — 50 | 40 — 89 | 1 — 10 |
| Dusts | 1 — 25 | 70 — 99 | 0 — 5 |
| Granules and Pellets | 1 — 35 | 65 — 99 | 0 — 15 |
| High Strength Compositions | 90 — 99 | 0 — 10 | 0 — 2 |

The actual percentages that can be realized with a particular compound of Formula I will depend upon its physical properties.

The manner of making and using such herbicidal formulations is described in numerous patents. See, for example, Luckenbaugh U.S. Pat. No. 3,309,192, Loux U.S. Pat. No. 3,235,357, Todd U.S. Pat. No. 2,655,445, Hamm et al. U.S. Pat. No. 2,863,752, Scherer et al. U.S. Pat. No. 3,079,244, Gysin et al. U.S. Pat. No. 2,891,855, and Barrous U.S. Pat. No. 2,642,354.

Examples of suitable formulations of compounds of the present invention include the following:

Example 1

| Solution: | % (by weight) |
|---|---|
| 1-methyl-3-cyclohexyl-6-methylthio-s-triazine-2,4(1H,3H)-dione | 37 |
| ethylene glycol monobutyl ether | 35 |
| methanol | 9 |
| water | 19 |

The ingredients are combined and stirred to produce a solution which can be extended with water for spraying.

EXAMPLE 2

| wettable powder: | % (by weight) |
|---|---|
| 1-methyl-3-cyclopentyl-6-methylthio-s-triazine-2,4(1H,3H)-dione | 25 |
| diatomaceous earth | 71.5 |
| dioctylsodium sulfosuccinate | 1.5 |
| low viscosity methyl cellulose | 2 |

The ingredients are thoroughly blended and passed through a hammer mill to produce particles essentially all below 100 microns.

The herbicidal activity of compounds of this invention was discovered in a greenhouse test. In this test, seeds of crabgrass (*Digitaria* spp.), barnyardgrass (*Echinochloa crus-galli*), wild oats (*Avena fatua*), Cassia tora, morningglory (*Ipomoea* spp.), mustard (*Brassica* spp.), radish (*Raphanus spp.*), marigold (*Tagetes* spp.), dock (*Rumex crispus*), and nutsedge tubers (*Cyperus spp.*) were planted in a growth medium and treated preemergence with the chemical dissolved in a non-phytotoxic solvent. Treated plants and controls were maintained in a greenhouse for 16 days, then all species were compared to controls and visually rated for responses to treatment. A qualitative (type of plant response) rating was made. The letter "C" indicates chlorosis; and "G" indicates growth retardation. The letter "S" indicates albinism. The symbol "*" indicates that the compound was not tested on the indicated plant. A qualitative rating on a scale of 0 to 10 means maximum effect, e.g., complete kill in case of chlorosis. Results obtained in this test for some highly active compounds of this invention are given in the following table:

PREEMERGENCE

|  | Kg/hectare | Crab-grass | Barn-yard grass | Wild oats | Nut-sedge | Cassia | Morning glory | Mus-tard | Radish | Mari-gold | Dock |
|---|---|---|---|---|---|---|---|---|---|---|---|
| 1-methyl-3-cyclopentyl-6-methylthio-s-triazine-2,4(1H,3H)-dione. | 2.2<br>0.44 | 10C<br>10C | 9C<br>8C | 10C<br>9C | 6C<br>0 | 10C<br>10C | 10C<br>10C | 10C<br>10C | 10C<br>10C | 10C<br>10C | 10C<br>9C |
| 1-methyl-3-cyclohexyl-6-ethoxy-s-triazine-2,4(1H,3H)-dione. | 2.2<br>0.44 | 10C<br>9C | 10C<br>10C | 10C<br>8C | 1C<br>0 | 10C<br>10C | 10C<br>10C | 10C<br>10C | 10C<br>10C | 10C<br>10C | 10C<br>10C |
| 1-methyl-3-*tert*-butyl-6-methylthio-s-triazine-2,4(1H,3H)-dione. | 11<br>2.2 | 8C<br>5G | 9C<br>6C | 8C<br>6C | 0<br>0 | 10C<br>10C | 10C<br>10C | 10C<br>10C | 10C<br>10C | 9C<br>5C | 9C<br>6C |

PREEMERGENCE—Continued

| | Kg/hectare | Crab-grass | Barn-yard grass | Wild oats | Nut-sedge | Cassia | Morning glory | Mustard | Radish | Marigold | Dock |
|---|---|---|---|---|---|---|---|---|---|---|---|
| 1-methyl-3-(p-chlorophenyl)-6-methylthio-s-triazine-2,4(1H,3H)-dione. | 2.2<br>0.44 | 7C<br>1C | 7C<br>4C | 4C<br>2C | 0<br>0 | 10C<br>10C | 10C<br>10C | 10C<br>10C | 9C<br>8C | 10C<br>2C | 10C<br>3C |
| 1-methyl-3-sec-butyl-6-methylthio-s-triazine-2,4(1H,3H)-dione. | 11<br>2.2 | 9C<br>9C | 10C<br>9C | 9C<br>8C | 0<br>0 | 10C<br>10C | 10C<br>10C | 10C<br>10C | 10C<br>10C | 10C<br>10C | 9C<br>10C |
| 1-methyl-3-cyclohexyl-6-methylthio-s-triazine-2,4(1H,3H)-dione. | 11<br>2.2 | 9C<br>9C | 10C<br>10C | 10C<br>10C | 2C<br>1C | 10C<br>10C | 10C<br>10C | 10C<br>10C | 10C<br>10C | 10C<br>10C | 10C<br>10C |
| 1-methyl-3-(m-chlorophenyl)-6-methylthio-s-triazine-2,4(1H,3H)-dione. | 11<br>2.2 | 9C<br>9C | 10C<br>10C | 10C<br>10C | 0<br>0 | 10C<br>10C | 10C<br>10C | 10C<br>10C | 10C<br>10C | 10C<br>10C | 10C<br>9C |
| 1-methyl-3-(o-fluorophenyl)-6-methylthio-s-triazine-2,4(1H,3H)-dione. | 11<br>2.2 | 9C<br>2G | 9C<br>4C | 9C<br>6C | 0<br>0 | 10C<br>10C | 10C<br>10C | 10C<br>10C | 10C<br>9C | 10C<br>9C | 9C<br>9C |
| 1-methyl-3-(2-methylcyclohexyl)-6-methylthio-s-triazine-2,4(1H,3H)-dione. | 2.2<br>0.44 | 9C<br>7C | 10C<br>9C | 9C<br>8C | 1C<br>0 | 10C<br>10C | 10C<br>10C | 10C<br>10C | 10C<br>10C | 10C<br>10C | 10C<br>9C |
| 1-methyl-3-cycloheptyl-6-methylthio-s-triazine-2,4(1H,3H)-dione. | 2.2<br>0.44 | 10C<br>10C | 10C<br>10C | 10C<br>9C | 2C<br>0 | 10C<br>10C | 10C<br>10C | 10C<br>10C | 10C<br>10C | 10C<br>10C | 10C<br>10C |
| 1-methyl-3-cyclooctyl-6-methylthio-s-triazine-2,4(1H,3H)-dione. | 2.2<br>0.44 | 9C<br>8C | 10C<br>8C | 10C<br>8C | 0<br>0 | 6C<br>3C | 10C<br>10C | 10C<br>10C | 10C<br>8C | 10C<br>6C | 8C<br>5C |
| 1-ethyl-3-cyclohexyl-6-methylthio-s-triazine-2,4(1H,3H)-dione. | 2.2<br>0.44 | 10C<br>9C | 10C<br>4G | 10C<br>5C | 0<br>0 | 1C<br>0 | 10C<br>10C | 10C<br>10C | 10C<br>10C | 10C<br>6G | 10C<br>9C |
| 1-methyl-3-(3-methylcyclohexyl)-6-methylthio-s-triazine-2,4(1H,3H)-dione. | 2.2<br>0.44 | 10C<br>9C | 10C<br>9C | 9C<br>8C | 5C<br>0 | 6C<br>5C | 10C<br>10C | 10C<br>10C | 10C<br>10C | 10C<br>10C | 9C<br>9C |
| 1-methyl-3-neopentyl-6-methylthio-s-triazine-2,4(1H,3H)-dione. | 2.2<br>0.44 | 7G<br>3G | 9C<br>5G | 9C<br>2C | 5G<br>(*) | 10C<br>10C | 10C<br>9C | 10C<br>10C | 10C<br>2C | 10C<br>2C | 10C<br>8C |
| 1-methyl-3-(p-chlorophenyl)-6-methoxy-s-triazine-2,4(1H,3H)-dione. | 11<br>2.2 | 10C<br>10C | 10C<br>4C | 10C<br>8S | 5C<br>2C | 10C<br>10C | 10C<br>9C | 10C<br>9C | 10C<br>9C | 10C<br>8C | 10C<br>10C |
| 1-methyl-3-isopropyl-6-methylthio-s-triazine-2,4(1H,3H)-dione. | 11<br>2.2 | 9C<br>8C | 10C<br>10C | 9C<br>7C | 2C<br>0 | 10C<br>10C | 10C<br>10C | 10C<br>10C | 10C<br>10C | 10C<br>10C | 10C<br>10C |

Further tests were conducted on two of the compounds of the present invention. In one test, seeds of wheat, wild oats, downy brome (*Bromus tectorum*) and cheat (*Bromus secralinus*) were planted in pots of soil and treated preemergence with 1-methyl-3-cyclopentyl-6-methylthio-s-triazine-2,4(1H,3H)-dione in a non-phytotoxic solvent. The pots were maintained in a greenhouse for one month. The species were compared to controls and visually rated for response to treatment as described above. The results obtained in this test are detailed in the following table:

| kg/hectare | wheat | wild oats | downy brome | cheat |
|---|---|---|---|---|
| 2.20 | 4G | 3C | 10C | 10C |
| 1.10 | | 2C | 10C | 10C |
| 0.55 | | 2C | 10C | 10C |
| 0.27 | | 0 | 10C | 9C |

In another test, seeds of wheat, wild oats, downy brome and cheat were planted in soil contained in greenhouse pots. After one week, the young plants were sprayed with 1-methyl-3-cyclopentyl-6-methylthio-s-triazine-2,4(1H,3H)-dione in a non-phytotoxic solvent with a wetting agent and a humectant. The pots were maintained in a greenhouse for three weeks. The species were compared to controls and visually rated for response to treatment as described above. The results obtained in this test are detailed in the following table:

| kg/hectare | wheat | wild oats | downy brome | cheat |
|---|---|---|---|---|
| 0.55 | 1C | 7C | 10C | 10C |
| 0.27 | 0 | 0 | 2C | 6C |
| 0.13 | 0 | 0 | 0 | 1C |
| 0.07 | 0 | 0 | 0 | 0 |

Thus, it can be seen that 1-methyl-3-cyclopentyl-6-methylthio-s-triazine-2,4(1H,3H)-dione is very effective as a selective herbicide for use in wheat crops both preemergence and post-emergence.

In another test, seeds of crabgrass, barnyardgrass, wild oats, johnsongrass (*Sorghum halepense*), dallasgrass (*Paspalum dilitatum*), giant foxtail (*Setaria faberii*), bluegrass (*Poa pratensis*), ripgut (*Bromus rigdus*), goosegrass (*Eleusine indica*), mustard, dock, pigweed (*Amaranthus retroflexus*), nutsedge, curly indigo (*Aeschynomene virginica*), yellow rocket (*Barbarea vulgarus*), teaweed (*Sida spinosa*), jimsonweed (*Datura stramonium*), morningglory and soybean were planted in containers of a Fallsington sandy loam soil and treated preemergence with 1-methyl-3-cyclohexyl-6-methylthio-s-triazine-2,4(1H,3H)-dione in a non-phytotoxic solvent. The treated containers were placed in a greenhouse and maintained for four weeks. The species were compared to controls and visually rated for response to treatment as described above. The results obtained in this test are detailed in the following table:

| | Kg./hectare | | | Kg./hectare | |
|---|---|---|---|---|---|
| | 1.10 | .28 | | 1.10 | .28 |
| Crab grass | 10C | 8C | Dock | 10C | 10C |
| Barnyard grass | 10C | 8C | Pigweed | 10C | 10C |
| Wild oats | 10C | 2C | Nutsedge | 0 | 0 |
| Johnson grass | 7C | 3G | Curley indigo | 10C | 5C |
| Dallas grass | 10C | 9C | Yellow rocket | 10C | 5G |
| Giant foxtail | 9C | 5C | Teaweed | 10C | 10C |
| Bluegrass | 10C | 8C | Jimsonweed | 8C | 10C |
| Ripgut | 10C | 10C | Morning glory | 10C | 10C |
| Goose grass | 10C | 5G | Soybean | 1C | 0 |
| Mustard | 10C | 10C | | | |

EXAMPLE 3

1-methyl-3-isopropyl-6-methylthio-s-triazine-2,4(1H,3H)-dione

To a solution of 69.5 parts of 2-methyl-2-thiopseudourea sulfate and 47 parts of methyl chloroformate in 1,000 parts of water at 0°C is added dropwise, 56.9 parts of potassium hydroxide in 200 parts of water. The reaction mixture is stirred at room temperature for 3 hours and then extracted with methylene chloride. The methylene chloride extract is dried and the solvent evaporated on a rotary evaporator to give 45 parts of methyl N-(1-amino-1-methylthiomethylene)-carbamate, m.p. 72°–77°C.

Seventy-four parts of the above compound and 47 parts of isopropyl isocyanate in 300 parts methylene chloride are stirred overnight. The solvent is evaporated on a rotary evaporator to give 113.6 parts of methyl 4-isopropyl-N-methoxycarbonyl-1-thioallophanimidate, m.p. 129°–132°C.

One hundred parts of the above compound is refluxed for 1 hour with 27 parts of sodium methoxide in 200 parts methanol. The methanol is stripped on a rotary evaporator and the residue dissolved in 200 parts of water. The aqueous solution is neutralized with hydrochloric acid, the solid filtered and dried to yield 55 parts of 3-isopropyl-6-methylthio-s-triazine-2,4(1H,3H)-dione, m.p. 188°–190°C.

To a solution of 32 parts of sodium methoxide in 400 parts of methanol is added 132 parts of 3-isopropyl-6-methylthio-s-triazine-2,4(1H,3H)-dione. The solution is evaporated under vacuum, and the white solid is triturated with methylene chloride and filtered to give 110 parts of sodium 3-isopropyl-6-methylthio-s-triazine-2,4(1H,3H)-dione, m.p. above 300°C.

Eighty parts of sodium 3-isopropyl-6-methylthio-s-triazine-2,4(1H,3H)-dione and 49 parts of methyl iodide are refluxed overnight in 700 parts of acetonitrile. The solvent is evaporated and the residue dissolved in methylene chloride. The methylene chloride solution is washed with water, dried, and evaporated to afford after recrystallization from chlorobutane/hexane 54 parts of 1-methyl-3-isopropyl-6-methylthio-s-triazine-2,4-(1H,3H)-dione, m.p. 74°–77°C.

EXAMPLE 4

1-Methyl-3-phenyl-6-methylthio-s-triazine-2,4(1H,3H)-dione

Twenty-six parts of sodium 3-phenyl-6-methylthio-s-triazine-2,4(1H,3H)-dione (prepared in a manner similar to that described in Example 1 for preparation of sodium 3-isopropyl-6-methylthio-s-triazine-2,4(1H,3H)-dione, except substituting phenyl isocyanate for the isopropyl isocyanate) and 16 parts of methyl iodide are refluxed in 200 parts of acetonitrile. The solvent is evaporated and the residue dissolved in methylene chloride. The methylene chloride solution is washed with water, dried, and evaporated to afford 18 parts of 1-methyl-3-phenyl-6-methylthio-s-triazine-2,4-(1H,3H)-dione, m.p. 232.5°–233°C.

EXAMPLE 5

1-Methyl-3-tert-butyl-6-methylthio-s-triazine-2,4(1H,3H)-dione

To a solution of 278 parts of 2-methyl-2-thiopseudourea sulfate in 2000 parts of 50% aqueous methanol at 0°C is added dropwise 176 parts of 50% sodium hydroxide, followed by 180 parts tert-butyl isocyanate in 400 parts tetrahydrofuran. The solution is partially evaporated on a rotary evaporator and filtered to yield, after drying, 180 parts of methyl 4-tert-butyl-1-thioallophanimidate, m.p. 102°–104°C.

To a solution of 113.4 parts of the above compound and 80 parts of triethylamine in 1,000 parts methylene chloride at 0°C is added dropwise 66 parts methyl chlorothiolformate in 100 parts of methylene chloride. The solution is stirred overnight, washed once with water, dried and evaporated to provide 76 parts methyl 4-tert-butyl-N-methylthiolcarbonyl-1-thioallophanimidate, m.p. 102°–105°C.

Fifty parts of the above compound is refluxed for one hour with 30 parts of sodium methoxide in 500 parts of methanol. The reaction mixture is then cooled and the methanol is stripped on a rotary evaporator. The residue is washed with ether to provide 30 parts sodium 3-tert-butyl-6-methylthio-s-triazine-2,4(1H,3H)-dione.

Twenty-four parts of sodium 3-tert-butyl-6-methylthio-s-triazine-2,4(1H,3H)-dione and 15.5 parts of methyl iodide are refluxed overnight in 200 parts of acetonitrile. The solvent is evaporated and the residue dissolved in methylene chloride. The methylene chloride solution is washed with water, dried, and evaporated to afford after recrystallization from chlorobutane 15 parts of 1-methyl-3-tert-butyl-6-methylthio-s-triazine-2,4(1H,3H)-dione, m.p. 138°–140°C.

EXAMPLE 6

1-Methyl-3-cyclohexyl-6-methylthio-s-triazine-2,4-(1H,3H)-dione

To 84 parts of methyl N-(1-amino-1-methylthiomethylene)-carbamate in 500 parts of methylene chloride is added 71 parts of cyclohexyl isocyanate and a catalyst amount of dibutyltin dilaurate. The solution is refluxed for 3 hours and cooled. To it is added 31 parts of sodium methoxide in 300 parts of methanol. The solution is refluxed for one hour and the solvent evaporated on a rotary evaporator. The residue is triturated with ether to give 71 parts of sodium 3-cyclohexyl-6-methylthio-s-triazine-2,4(1H,3H)-dione, m.p. above 300°C.

A suspension of 26 parts of the above compound in 200 parts of acetonitrile containing 16 parts of methyl iodide is refluxed overnight. The solvent is evaporated on a rotary evaporator. Water and methylene chloride are added to the residue. The methylene chloride layer is dried and evaporated on a rotary evaporator to give after trituration with pentane 19 parts of 1-methyl-3-cyclohexyl-6-methylthio-s-triazine-2,4(1H,3H)-dione, m.p. 135°–137°C.

The product is also prepared by using dimethyl sulfate as the alkylating agent. To 439 parts of 3-cyclohexyl-6-methylthio-s-triazine-2,4(1H,3H)-dione sodium salt in 2,500 parts of water of 25°C and pH 9–9.5 is added dropwise over one hour 284 parts of dimethyl sulfate. The solid formed is filtered and dried to give 324 parts of crude 1-methyl-3-cyclohexyl-6-methylthio-s-triazine-2,4(1H,3H)-dione, m.p. 134°–138°C.

EXAMPLE 7

1-Methyl-3-cyclopentyl-6-methylthio-s-triazine-2,4(1H,3H)-dione

Fifty parts of sodium 3-cyclopentyl-6-methylthio-s-triazine-2,4(1H,3H)-dione (prepared in a manner similar to that described in Example 1 for preparation of sodium 3-isopropyl-6-methylthio-s-triazine-2,4(1H,3H)-dione, but substituting cyclopentyl isocyanate for the isopropyl isocyanate) and 31 parts of methyl iodide are refluxed in 400 parts of acetonitrile. The solvent is evaporated and the residue is dissolved in methylene chloride. The methylene chloride solution is washed with water, dried, evaporated, and the residue is recrystallized in a chlorobutane/hexane mixture to afford 24 parts of 1-methyl-3-cyclopentyl-6-methylthio-s-triazine-2,4(1H,3H)-dione, m.p. 80°–83°C.

EXAMPLE 8

1-Methyl-3-(p-chlorophenyl)-6-methoxy-s-triazine-2,4(1H,3H)-dione

To 52 parts of 2-methylpseudourea hydrogen sulfate in 250 parts of water at 0°–5°C is added 31 parts of methyl chloroformate, followed by dropwise addition of 74 parts of 50% sodium hydroxide. The reaction mass is stirred at room temperature for 3 hours, then extracted with methylene chloride. The methylene chloride extract is dried and the solvent evaporated. The residue is triturated with hexane to give 23 parts of methyl N-(1-amino-1-methoxy-methylene)-carbamate, m.p. 36°–39.5°C.

To 130 parts of the above compound in 200 ml of methylene chloride is added 150 parts of p-chlorophenyl isocyanate. The reaction mass is stirred overnight. The solvent is evaporated and the residue refluxed for 3 hours in 100 parts of methanol containing 54 parts of sodium methoxide. The mixture is evaporated to dryness to give 300 parts of sodium 3-(p-chlorophenyl)-6-methoxy-s-triazine-2,4(1H,3H)-dione.

To 70 parts of the triazinedione sodium salt in 250 parts of dimethylformamide is added 54 parts of methyl p-toluenesulfonate. The mixture is stirred overnight at room temperature, and the solvent is evaporated under vacuum. The residue is triturated with a 1% sodium carbonate solution, and the resulting solid is recrystallized from acetonitrile to give 30 parts of pure 1-methyl-3-(p-chlorophenyl)-6-methoxy-s-triazine-2,4(1H,3H)-dione, m.p. 185°–187°C.

EXAMPLE 9

The s-triazinediones listed in the following table can be prepared by the procedures of Examples 3–8 by substituting the listed 2-substituted thiopseudoureas and pseudoureas for 2-methylpseudourea and 2-methyl-2-thiopseudourea, by employing other isocyanates and by replacing the methyl p-toluenesulfonate and methyl iodide with the listed alkylating agents:

| Thiopseudourea or Pseudourea | Isocyanate | Alkylating Agent | s-Triazinediones |
|---|---|---|---|
| 2-ethylpseudourea | isopropyl isocyanate | methyl p-toluenesulfonate | 1-methyl-3-isopropyl-6-ethoxy-s-triazine-2,4(1H,3H)-dione $N_D^{25} = 1.4900$ |
| 2-methylpseudourea | m-fluorophenyl isocyanate | do. | 1-methyl-3-(m-fluorophenyl)-6-methoxy-s-triazine-2,4(1H,3H)-dione, m.p. 156–158°C |
| do. | m-chlorophenyl isocyanate | do. | 1-methyl-3(m-chlorophenyl)-6-methoxy-s-triazine-2,4(1H,3H)-dione, m.p. 186–188°C |
| 2-ethylpseudourea | cyclohexyl isocyanate | do. | 1-methyl-3-cyclohexyl-6-ethoxy-s-triazine-2,4(1H,3H)-dione, $N_D^{25} = 1.5610$ |
| 2-methyl-2-thiopseudourea | sec-butyl isocyanate | methyl iodide | 1-methyl-3-sec-butyl-6-methylthio-s-triazine-2,4(1H, 3H)-dione, $N_D^{25} = 1.5382$ |
| do. | 1-methylcyclopentyl isocyanate | do. | 1-methyl-3-(1-methylcyclopentyl)-6-methylthio-s-triazine-2,4(1H, 3H)-dione, m.p. 84–86°C. |
| do. | cycloheptyl isocyanate | do. | 1-methyl-3-cycloheptyl-6-methylthio-s-triazine-2,4(1H,3H)-dione, m.p. 98–101°C |
| do. | 2-methylcyclohexyl isocynate | do. | 1-methyl-3-(2-methylcyclohexyl)-6-methylthio-s-triazine-2,4(1H,3H)-dione, m.p. 98–100°C |
| do. | 2,4,6-trimethylcyclohexyl isocyanate | do. | 1-methyl-3-(2,4,6-trimethylcyclohexyl)-6-methylthio-s-triazine-2,4(1H,3H)-dione |
| do. | 3,5-dimethylcyclohexyl isocyanate | do. | 1-methyl-3-(3,5-dimethylcyclohexyl)-6-methylthio-s-triazine-2,4(1H,3H)-dione, $N_D^{25} = 1.5400$ |
| do. | 2,3,5,6-tetramethylcyclohexyl isocyanate | do. | 1-methyl-3-(2,3,5,6-tetramethylcyclohexyl)-6-methylthio-s-triazine-2,4(1H,3H)-dione |
| do. | 3,4-dimethycyclohexyl isocyanate | do. | 1-methyl-3-(3,4-dimethylcyclohexyl)-6-methylthio-s-triazine-2,4(1H,3H)-dione, m.p. 85–87° |
| do. | 2,5-dimethylcyclohexyl isocyanate | do. | 1-methyl-3-(2,5-dimethylcyclohexyl)-6-methylthio-s-triazine-2,4-(1H,3H)-dione, $N_D^{25} = 1.5382$ |
| 2-methyl-2-thiopseudourea | cyclooctyl isocyanate | methyl iodide | 1-methyl-3-cyclooctyl-6-methylthio-s-triazine-2,4(1H,3H)-dione, m.p. 93–94.5°C. |
| do. | 3-methylcyclohexyl isocyanate | do. | 1-methyl-3-(3-methylcyclohexyl)-6-methylthio-s-triazine-2,4(1H,3H)-dione, m.p. 95–97°C. |
| do. | neopentyl isocyanate | do. | 1-methyl-3-neopentyl-6-methylthio-s-triazine-2,4(1H,3H)-dione, m.p. 99–103°C. |
| do. | isopropyl isocyanate | n-butyl iodide | 1-butyl-3-isopropyl-6-methylthio-s-triazine-2,4(1H,3H)-dione, $N_D^{25} = 1.5143$ |
| do. | p-chlorophenyl isocyanate | n-propyl iodide | 1-propyl-3-(p-chlorophenyl)-6-methylthio-s-triazine-2,4(1H,3H)-dione, m.p. 148–150°C |
| do. | isopropyl isocyanate | do. | 1-propyl-3-isopropyl-6-methylthio-s-triazine-2,4(1H,3H)-dione, m.p. 92–96°C |
| do. | do. | methyl iodide | 1-methyl-3-isopropyl-6-methylthio-s-triazine-2,4(1H,3H)-dione, $N_D^{25} = 1.5257$ |
| do. | m-trifluoromethylphenyl isocyanate | do. | 1-methyl-3-(m-trifluoromethylphenyl)-6-methylthio-s-triazine-2,4(1H,3H)-dione, m.p. 70.5–73°C |
| do. | m-nitrophenyl isocyanate | do. | 1-methyl-3-(m-nitrophenyl)-6-methylthio-s-triazine-2,4(1H,3H)-dione, m.p. 239–240°C |
| do. | benzyl isocyanate | do. | 1-methyl-3-benzyl-6-methylthio-s-triazine-2,4(1H,3H)-dione, m.p. 138–141°C |

| Thiopseudourea or Pseudourea | Isocyanate | Alkylating Agent | s-Triazinediones |
|---|---|---|---|
| 2-methyl-2-thiopseudourea | butyl isocyanate | methyl iodide | 1-methyl-3-butyl-6-methylthio-s-triazine-2,4(1H,3H)-dione, m.p. 78–79°C. |
| do. | 2,5-dichlorophenyl isocyanate | do. | 1-methyl-3-(2,5-dichlorophenyl)-6-methylthio-s-triazine-2,4(1H,3H)-dione, m.p. 255–258°C. |
| do. | cyclopropyl isocyanate | do. | 1-methyl-3-cyclopropyl-6-methylthio-s-triazine-2,4(1H,3H)-dione, m.p. 146–150°C. |
| do. | 2,6-dimethylphenyl isocyanate | do. | 1-methyl-3-(2,6-dimethylphenyl)-6-methylthio-s-triazine-2,4(1H,3H)-dione, m.p. 178–181°C. |
| do. | 2-methyl-5-chlorophenyl isocyanate | do. | 1-methyl-3-(2-methyl-5-chlorophenyl)-6-methylthio-s-triazine-2,4(1H,3H)-dione m.p. 203.5–206° |
| do. | 3-chloro-4-methylphenyl isocyanate | do. | 1-methyl-3-(3-chloro-4-methylphenyl)-6-methylthio-s-triazine-2,4(1H,3H)-dione, m.p. 228–230°C |
| do. | phenyl isocyanate | do. | 1-methyl-3-phenyl-6-methylthio-s-triazine-2,4(1H,3H)-dione, m.p. 232.5–233°C. |
| do. | cyclohexyl isocyanate | ethyl iodide | 1-ethyl-3-cyclohexyl-6-methylthio-s-triazine-2,4(1H,3H)-dione, $N_D^{25}$ = 1.5424 |
| do. | o-fluorophenyl isocyanate | methyl iodide | 1-methyl-3-(o-fluorophenyl)-6-methylthio-s-triazine-2,4(1H,3H)-dione, m.p. 129–132°C. |
| do. | o-nitrophenyl isocyanate | do. | 1-methyl-3-(o-nitrophenyl)-6-methylthio-s-triazine-2,4(1H,3H)-dione |
| do. | propyl isocyanate | do. | 1-methyl-3-propyl-6-methylthio-s-triazine-2,4(1H,3H)-dione, m.p. 189–191°C. |
| do. | m-tolyl isocyanate | do. | 1-methyl-3-(m-tolyl)-6-methylthio-s-triazine-2,4(1H,3H)-dione, m.p. 192.5–195.5°C. |
| do. | allyl isocyanate | do. | 1-methyl-3-allyl-6-methylthio-s-triazine-2,4(1H,3H)-dione, m.p. 132–133.5°C. |
| 2-methyl-2-thiopseudourea | 3,4-dichlorophenyl isocyanate | methyl iodide | 1-methyl-3-(3,4-dichlorophenyl)-6-methylthio-s-triazine-2,4(1H,3H)-dione, m.p. 204.5–207°C |
| do. | p-fluorophenyl isocyanate | isopropyl iodide | 1-isopropyl-3-(p-fluorophenyl)-6-methylthio-s-triazine-2,4(1H,3H)-dione |
| do. | p-nitrophenyl isocyanate | isobutyl iodide | 1-isobutyl-3-(p-nitrophenyl)-6-methylthio-s-triazine-2,4(1H,3H)-dione |
| do. | p-bromophenyl isocyanate | 2-iodobutane | 1-sec-butyl-3-(p-bromophenyl)-6-methylthio-s-triazine-2,4(1H,3H)-dione |
| do. | o-chlorophenyl isocyanate | methyl iodide | 1-methyl-3-(o-chlorophenyl)-6-methylthio-s-triazine-2,4(1H,3H)-dione, m.p. 152–154.5°C |
| do. | m-chlorophenyl isocyanate | do. | 1-methyl-3-(m-chlorophenyl)-6-methylthio-s-triazine-2,4(1H,3H)-dione, m.p. 297–297.5°C |
| do. | cyclohexylmethyl isocyanate | do. | 1-methyl-3-cyclohexylmethyl-6-methylthio-s-triazine-2,4(1H,3H)-dione, m.p. 102.5–104°C |
| 2-allyl-2-thiopseudourea | isopropyl isocyanate | do. | 1-methyl-3-isopropyl-6-allylthio-s-triazine-2,4(1H,3H)-dione |
| 2-methylpseudourea | octyl isocyanate | methyl p-toluene sulfonate | 1-methyl-3-octyl-6-methoxy-s-triazine-2,4(1H,3H)-dione |
| 2-methylpseudourea | cyclohexyl isocyanate | methyl p-toluene sulfonate | 1-methyl-3-cyclohexyl-6-methoxy-s-triazine-2,4(1H,3H)-dione |
| do. | p-fluorophenyl isocyanate | do. | 1-methyl-3-(p-fluorophenyl)-6-methoxy-s-triazine-2,4(1H,3H)-dione |
| do. | sec-butyl isocyanate | do. | 1-methyl-3-sec-butyl-6-methoxy-s-triazine-2,4(1H,3H)-dione |
| do. | p-chlorophenyl isocyanate | isopropyl p-toluenesulfonate | 1-isopropyl-3-(p-chlorophenyl)-6-methoxy-s-triazine-2,4(1H,3H)-dione |
| 2-ethylpseudourea | do. | methyl p-toluene-sulfonate | 1-methyl-3-(p-chlorophenyl)-6-ethoxy-s-triazine-2,4(1H,3H)-dione |
| 2-methylpseudourea | p-nitrophenyl isocyanate | do. | 1-methyl-3-(p-nitrophenyl)-6-methoxy-s-triazine-2,4(1H,3H)-dione |
| do. | p-bromophenyl isocyanate | do. | 1-methyl-3-(p-bromophenyl)-6-methoxy-s-triazine-2,4(1H,3H)-dione |
| do. | 3,4-dichlorophenyl isocyanate | do. | 1-methyl-3-(3,4-dichlorophenyl)-6-methoxy-s-triazine-2,4(1H,3H)-dione |
| do. | p-methoxyphenyl isocyanate | do. | 1-methyl-3-(p-methoxyphenyl)-6-methoxy-s-triazine-2,4(1H,3H)-dione |
| do. | p-tolyl isocyanate | do. | 1-methyl-3-(p-tolyl)-6-methoxy-s-triazine-2,4(1H,3H)-dione |
| do. | benzyl isocyanate | do. | 1-methyl-3-benzyl-6-methoxy-s-triazine-2,4(1H,3H)-dione |
| do. | 2,4-dichlorophenyl isocyanate | do. | 1-methyl-3-(2,4-dichlorophenyl)-6-methoxy-s-triazine-2,4(1H,3H)-dione, m.p. 165–166°C. |
| 2-hexyl-2-thiopseudourea | propyl isocyanate | methyl iodide | 1-methyl-3-propyl-6-hexylthio-s-triazine-2,4(1H,3H)-dione |
| 2-cyclopropyl-2-thiopseudourea | cyclopropyl isocyanate | methyl iodide | 1-methyl-3-cyclopropyl-6-cyclopropyl thio-s-triazine-2,4(1H,3H)-dione |
| 2-cyclohexyl-2-thiopseudourea | cyclooctyl isocyanate | do. | 1-methyl-3-cyclooctyl-6-cyclohexyl-thio-s-triazine-2,4(1H,3H)-dione |
| 2-allyl-2-thiopseudourea | cyclopropylmethyl isocyanate | methyl iodide | 1-methyl-3-cyclopropylmethyl-6-allylthio-s-triazine-2,4(1H,3H)-dione |
| 2-(2-butenyl)-2-thiopseudourea | cyclohexylmethyl isocyanate | do. | 1-methyl-3-cyclohexylmethyl-6-(2-butenylthio)-s-triazine-2,4(1H,3H)-dione |
| 2-propargyl-2-thiopseudourea | allyl isocyanate | do. | 1-methyl-3-allyl-6-propargylthio-s-triazine-2,4(1H,3H)-dione |
| 2-(2-butynyl)-2-thiopseudourea | 2-butenyl isocyanate | do. | 1-methyl-3-(2-butenyl)-6-(2-butynylthio)-s-triazine-2,4(1H,3H)-dione |

| Thiopseudourea or Pseudourea | Isocyanate | Alkylating Agent | s-Triazinediones |
|---|---|---|---|
| 2-benzyl-2-thiopseudourea | propargyl isocyanate | do. | 1-methyl-3-propargyl-6-benzylthio-s-triazine-2,4(1H,3H)-dione |
| 2-methylpseudourea | 2-butynyl isocyanate | methyl p-toluene-sulfonate | 1-methyl-3-(2-butynyl)-6-methoxy-s-triazine-2,4(1H,3H)-dione |
| 2-hexylpseudourea | benzyl isocyanate | do. | 1-methyl-3-benzyl-6-hexyloxy-s-triazine-2,4(1H,3H)-dione |
| 2-methyl-2-thio-pseudourea | p-iodophenyl isocyanate | methyl iodide | 1-methyl-3-(p-iodophenyl)-6-methylthio-s-triazine-2,4(1H,3H)-dione |
| 2-ethyl-2-thio-pseudourea | m-tolyl isocyanate | methyl iodide | 1-methyl-3-(m-tolyl)-6-ethylthio-s-triazine-2,4(1H,3H)-dione |
| do. | p-butylphenyl isocyanate | do. | 1-methyl-3-(p-butylphenyl)-6-ethylthio-s-triazine-2,4(1H,3H)-dione |
| do. | p-nitrophenyl isocyanate | do. | 1-methyl-3-(p-nitrophenyl)-6-ethylthio-s-triazine-2,4(1H,3H)-dione |
| do. | o-methoxyphenyl isocyanate | do. | 1-methyl-3-(o-methoxyphenyl)-6-ethylthio-s-triazine-2,4(1H,3H)-dione |
| do. | m-butoxyphenyl isocyanate | do. | 1-methyl-3-(m-butoxyphenyl)-6-ethylthio-s-triazine-2,4(1H,3H)-dione |
| do. | cyclopentyl isocyanate | do. | 1-methyl-3-cyclopentyl-6-ethylthio-s-triazine-2,4-(1H,3H)-dione, m.p. 49–51°C. |
| 2-methyl-2-thio-pseudourea | p-methylthio-phenyl isocyanate | do. | 1-methyl-3-(p-methylthiophenyl)-6-methylthio-s-triazine-2,4(1H,3H)-dione |
| do. | m-butylthiophenyl isocyanate | do. | 1-methyl-3-(m-butylthiophenyl)-6-methylthio-s-triazine-2,4(1H,3H)-dione |
| do. | p-cyanophenyl isocyanate | do. | 1-methyl-3-(p-cyanophenyl)-6-methylthio-s-triazine-2,4(1H,3H)-dione |
| do. | m-trifluoromethyl-phenyl isocyanate | do. | 1-methyl-3-(m-trifluoromethylphenyl)-6-methylthio-s-triazine-2,4(1H,3H)-dione, m.p. 70.5–73°C |
| do. | 3,5-dichlorophenyl isocyanate | do. | 1-methyl-3-(3,5-dichlorophenyl)-6-methylthio-s-triazine-2,4(1H,3H)-dione |
| do. | p-bromo-m-chloro-phenyl isocyanate | do. | 1-methyl-3-(p-bromo-m-chlorophenyl)-6-methylthio-s-triazine-2,4(1H,3H)-dione |
| 2-methyl-2-thio-pseudourea | 2-chloro-4-methyl-phenyl isocyanate | methyl iodide | 1-methyl-3-(2-chloro-4-methylphenyl)-6-methylthio-s-triazine-2,4(1H,3H)-dione |
| do. | 2-methyl-4-chloro-phenyl isocyanate | do. | 1-methyl-3-(2-methyl-4-chlorophenyl)-6-methylthio-s-triazine-2,4(1H,3H)-dione, m.p. 165–167°C |
| do. | 2-ethylhexyl isocyanate | do. | 1-methyl-3-(2-ethylhexyl)-6-methylthio-s-triazine-2,4(1H,3H)-dione |
| 2-ethylpseudourea | 2-chloro-5-methoxy-phenyl isocyanate | methyl p-toluene-sulfonate | 1-methyl-3-(2-chloro-5-methoxyphenyl)-6-ethoxy-s-triazine-2,4(1H,3H)-dione |
| do. | 3-methyl-4-bromo-phenyl isocyanate | do. | 1-methyl-3-(3-methyl-4-bromophenyl)-6-ethoxy-s-triazine-2,4(1H,3H)-dione |
| do. | 2-bromo-4-nitro-phenyl isocyanate | do. | 1-methyl-3-(2-bromo-4-nitrophenyl)-6-ethoxy-s-triazine-2,4(1H,3H)-dione |
| do. | 2-nitro-4-chloro-phenyl isocyanate | do. | 1-methyl-3-(2-nitro-4-chlorophenyl)-6-ethoxy-s-triazine-2,4(1H,3H)-dione |
| do. | 2,4-dichlorophenyl isocyanate | do. | 1-methyl-3-(2,4-dichlorophenyl)-6-ethoxy-s-triazine-2,4(1H,3H)-dione |
| 2-methylpseudo-urea | 2,4-dibromophenyl isocyanate | do. | 1-methyl-3-(2,4-dibromophenyl)-6-methoxy-s-triazine-2,4(1H,3H)-dione |
| do. | 2,5-dichloro-4-nitrophenyl isocyanate | do. | 1-methyl-3-(2,5-dichloro-4-nitrophenyl)-6-methoxy-s-triazine-2,4(1H,3H)-dione |
| do. | 3,4-diethoxyphenyl isocyanate | do. | 1-methyl-3-(3,4-diethoxyphenyl)-6-methoxy-s-triazine-2,4(1H,3H)-dione |
| 2-methylpseudo-urea | 2,4-difluorophenyl isocyanate | methyl p-toluene sulfonate | 1-methyl-3-(2,4-difluorophenyl)-6-methoxy-s-triazine-2,4(1H,3H)-dione |
| do. | 2,5-dimethoxyphenyl isocyanate | do. | 1-methyl-3-(2,5-dimethoxyphenyl)-6-methoxy-s-triazine-2,4(1H,3H)-dione |
| do. | 3,5-dinitrophenyl isocyanate | do. | 1-methyl-3-(3,5-dinitrophenyl)-6-methoxy-s-triazine-2,4(1H,3H)-dione |
| do. | 2-fluoro-4,6-dinitro-phenyl isocyanate | do. | 1-methyl-3-(2-fluoro-4,6-dinitrophenyl)-6-methoxy-s-triazine-2,4-(1H,3H)-dione |
| do. | 3-nitro-4-fluoro-phenyl isocyanate | do. | 1-methyl-3-(3-nitro-4-fluorophenyl)-6-methoxy-s-triazine-2,4(1H,3H)-dione |
| do. | 2-methyl-4-methoxy-phenyl isocyanate | do. | 1-methyl-3-(2-methyl-4-methoxyphenyl)-6-methoxy-s-triazine-2,4(1H,3H)-dione |
| do. | 2-methoxy-4-nitro-phenyl isocyanate | do. | 1-methyl-3-(2-methoxy-4-nitrophenyl)-6-methoxy-s-triazine-2,4(1H,3H)-dione |
| do. | 2,4,5-trichloro-phenyl isocyanate | do. | 1-methyl-3-(2,4,5-trichlorophenyl)-6-methoxy-s-triazine-2,4(1H,3H)-dione |
| do. | 2,4,6-trimethyl-phenyl isocyanate | do. | 1-methyl-3-(2,4,6-trimethylphenyl)-6-methoxy-s-triazine-2,4(1H,3H)-dione |
| do. | o-chlorophenyl isocyanate | do. | 1-methyl-3-(o-chlorophenyl)-6-methoxy-s-triazine-2,4(1H,3H)-dione |
| do. | 2,4-dichlorophenyl isocyanate | do. | 1-methyl-3-(2,4-dichlorophenyl)-6-methoxy-s-triazine-2,4(1H,3H)-dione |
| do. | o-tolyl isocyanate | do. | 1-methyl-3-(o-tolyl)-6-methoxy-s-triazine-2,4(1H,3H)-dione |
| 2-methylpseudourea | 2,5-dibutoxyphenyl isocyanate | methyl p-toluene sulfonate | 1-methyl-3-(2,5-dibutoxyphenyl)-6-methylthio-s-triazine-2,4(1H,3H)-dione |
| do. | 2,4-diethylphenyl isocyanate | do. | 1-methyl-3-(2,4-diethylphenyl)-6-methyl-thio-s-triazine-2,4(1H,3H)-dione |

| Thiopseudourea or Pseudourea | Isocyanate | Alkylating Agent | s-Triazinediones |
|---|---|---|---|
| 2-methyl-2-thio-pseudourea | 2,3-dimethylcyclohexyl isocyanate | methyl iodide | 1-methyl-3(2,3-dimethylcyclohexyl)-6-methyl-thio-s-triazine-2,4-(1H,3H)-dione, $N_D^{25} = 1.5382$ |
| do. | 2,4-dimethylcyclohexyl isocyanate | do. | 1-methyl-3(2,4-dimethylcyclohexyl)-6-methyl-thio-s-triazine-2,4-(1H,3H)-dione, $N_D^{25} = 1.5332$ |
| do. | cyclopentyl isocyanate | ethyl iodide | 1-ethyl-3-cyclopentyl-6-methylthio-s-triazine-2,4-(1H,3H)-dione, m.p. 68–70°C. |
| do. | do. | n-propyl iodide | 1-n-propyl-3-cyclopentyl-6-methylthio-s-triazine-2,4-(1H,3H)-dione, $N_D^{25} = 1.5444$ |
| do. | do. | n-butyl iodide | 1-n-butyl-3-cyclopentyl-6-methylthio-s-triazine-2,4-(1H,3H)-dione, $N_D^{25} = 1.5420$ |
| do. | p-ethylphenyl isocyanate | methyl iodide | 1-methyl-3-(p-ethylphenyl)-6-methylthio-s-triazine-2,4-(1H,3H)-dione, m.p. 195–198° |
| do. | 3,4-xylyl isocyanate | do. | 1-methyl-3-(3,4-xylyl)-6-methylthio-s-triazine-2,4-(1H,3H)-dione, m.p. 206° |
| do. | 4-chloro-3-trifluoromethyl-phenyl isocyanate | do. | 1-methyl-3-(4-chloro-3-trifluoromethylphenyl)-6-methylthio-s-triazine-2,4-(1H,3H)-dione, m.p. 207–212° |
| do. | 4-chloro-3-fluoro-phenyl isocyanate | do. | 1-methyl-3-(4-chloro-3-trifluorophenyl)-6-methylthio-s-triazine-2,4-(1H,3H)-dione, m.p. 180–182° |
| 2-methyl-2-thio-pseudourea | p-methoxyphenyl isocyanate | methyl iodide | 1-methyl-3-(p-methoxyphenyl)-6-methylthio-s-triazine-2,4-(1H,3H)-dione, m.p. 196–201°C. |
| do. | p-ethoxyphenyl isocyanate | do. | 1-methyl-3-(p-ethoxyphenyl)-6-methylthio-s-triazine-2,4-(1H,3H)-dione, m.p. 196.5–199°C. |
| do. | 2,4-dimethylphenyl isocyanate | do. | 1-methyl-3-(2,4-dimethoxyphenyl)-6-methylthio-s-triazine-2,4-(1H,3H)-dione, m.p. 157–159°C. |
| do. | m-iodophenyl isocyanate | do. | 1-methyl-3-(m-iodophenyl)-6-methylthio-s-triazine-2,4-(1H,3H)-dione, m.p. 168–174°C. |
| do. | p-cyanophenyl isocyanate | do. | 1-methyl-3-(p-cyanophenyl)-6-methylthio-s-triazine-2,4-(1H,3H)-dione, m.p. 212–214°C. |
| 2-methyl-pseudourea | cyclopentyl isocyanate | methyl p-toluene sulfonate | 1-methyl-3-cyclopentyl-6-methoxy-s-triazine-2,4-(1H,3H)-dione, m.p. 96–97°C. |

EXAMPLE 10

1-Methyl-3-cyclohexyl-6-methylthio-s-triazine-4-thio-2,4(1H,3H)-dione 7.8 Parts of phosphorus pentasulfide is added to a mixture of 25.5 parts of 1-methyl-3-cyclohexyl-6-methylthio-s-triazine-2,4(1H,3H)-dione (prepared by the process described in Example 6) in 60 parts of pyridine. The mixture is refluxed for 12 hours. After cooling, 30 parts of said pyridine is removed by evaporation at reduced pressure, and 100 parts of benzene is added to the residue. The mixture is heated to reflux, and the supernatant is decanted. The residue is mixed with 100 parts of fresh benzene and heated to reflux. The supernatant is again decanted. The procedure is repeated a third time with 100 parts of benzene. The supernatants are combined and concentrated at reduced pressure, and the resulting crude product is extracted with fresh benzene. The benzene solution is concentrated and passed into a chromatographic column containing 700 parts of activity III neutral alumina. Fresh benzene is passed through the column, and the eluate from the first 1250 parts of benzene is concentrated to dryness to give 18.6 parts of 1-methyl-3-cyclohexyl-6-methylthio-s-triazine-4-thio-2,4(1H,3H)-dione, m.p. 157°–159°C.

The following s-triazine-4-thio-2,4(1H,3H)-diones can be prepared in a similar manner by using the appropriate reactants:

1-methyl-3-cyclohexyl-6-methylthio-4-thio-s-triazine-2,4(1H,3H)-dione, m.p. 158°–159°C.

1-methyl-3-cyclopentyl-6-methylthio-4-thio-s-triazine-2,4(1H,3H)-dione, m.p. 99°–102°C.

1-methyl-3-isopropyl-6-methylthio-4-thio-s-triazine-2,4(1H,3H)-dione 1-methyl-3-tert-butyl-6-methylthio-4-thio-s-triazine-2,4(1H,3H)-dione 1-methyl-3-cyclopentyl-6-methoxy-4-thio-s-triazine-2,4(1H,3H)-dione 1-methyl-3-cyclohexyl-6-methoxy-4-thio-s-triazine-2,4(1H,3H)-dione 1-methyl-3-cyclopentyl-6-ethylthio-4-thio-s-triazine-2,4(1H,3H)-dione

EXAMPLE 11

1-Methyl-3-cyclopentyl-6-methylthio-2-thio-s-triazine-2,4(1H,3H)-dione

The above named compound can be made by the following process:

Twenty-one parts of methyl N-methyl-4-cyclopentyl-1-thioallophanimidate and 20 parts of triethylamine in 200 parts of methylene chloride are added dropwise to a solution of 12 parts of thiophosgene in 200 parts of methylene chloride at 0°C. The reaction is kept at 0°C for one hour and refluxed for 10 hours. The solution is washed with water and dried. The solvent is evaporated to give a residue which is recrystallized from chlorobutane to give 1-methyl-3-cyclopentyl-6-methylthio-2-thio-s-triazine-2,4(1H,3H)-dione.

The following thio-s-triazine-2,4(1H,3H)-diones and s-triazine-2,4(1H,3H)-dithiones can be prepared in a similar manner by using the appropriate reactants:

1-methyl-3-cyclohexyl-6-methylthio-2-thio-s-triazine-2,4(1H,3H)-dione 1-methyl-3-isopropyl-6-methylthio-2-thio-s-triazine-2,4(1H,3H)-dione 1-methyl-3-tert-butyl-6-methylthio-2-thio-s-triazine-2,4(1H,3H)-dione 1-methyl-3-cyclopentyl-6-methoxy-2-thio-s-triazine-2,4(1H,3H)-dione 1-methyl-3-cyclohexyl-6-methoxy-2-thio-s-triazine-2,4(1H,3H)-dione 1-methyl-3-cyclopentyl-6-ethylthio-2-thio-s-triazine-2,4(1H,3H)-dione 1-methyl-3-cyclopentyl-6-methylthio-s-triazine-2,4-(1H,3H)-dithione 1-methyl-3-cyclohexyl-6-methylthio-s-triazine-2,4-(1H,3H)-dithione 1-methyl-3-isopropyl-6-methylthio-s-triazine-2,4-(1H,3H)-dithione 1-methyl-3-tert-butyl-6-methylthio-s-triazine-2,4-(1H,3H)-dithione 1-methyl-3-cyclopentyl-6-methoxy-s-triazine-2,4-(1H,3H)-dithione 1-methyl-3-cyclohexyl-6-ethoxy-s-triazine-2,4-(1H,3H)-dithione.

We claim:

1. A compound of the formula

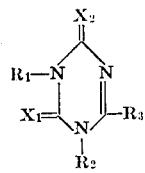

wherein $R_1$ is alkyl of 3 through 8 carbon atoms, cycloalkyl of 3 through 8 carbon atoms, methylcyclopentyl, methylcyclohexyl, dimethylcyclohexyl, trimethylcyclohexyl, tetramethylcyclohexyl, cycloalkylalkyl of 4 through 7 carbon atoms, alkenyl of 3 through 4 carbon atoms, alkynyl of 3 through 4 carbon atoms, benzyl, or

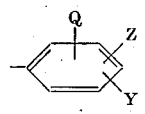

where

Y is hydrogen, halogen, alkyl of 1 through 4 carbon atoms, nitro, alkoxy of 1 through 4 carbon atoms, alkylthio of 1 through 4 carbon atoms, cyano, or trifluoromethyl, and Z is hydrogen, halogen, methyl, ethyl, nitro, alkoxy of 1 through 4 carbon atoms, or alkylthio of 1 through 4 carbon atoms; and Q is hydrogen, halogen, or methyl;

$R_2$ is alkyl of 1 through 4 carbon atoms, $R_3$ is $SR_4$ or $OR_4$ where $R_4$ is alkyl of 1 through 6 carbon atoms, cycloalkyl of 3 through 6 carbon atoms, alkenyl of 3 through 4 carbon atoms, alkynyl of 3 through 4 carbon atoms, or benzyl, and $X_1$ and $X_2$ are oxygen or sulfur.

2. A compound of claim 1 wherein $R_1$ is alkyl of 3 through 8 carbon atoms, cycloalkyl of 3 through 8 carbon atoms, cycloalkylalkyl of 4 through 7 carbon atoms, alkenyl or 3 through 4 carbon atoms, alkynyl of 3 through 4 carbon atoms, benzyl, or

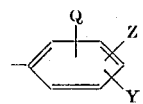

where

Y is hydrogen, halogen, alkyl of 1 through 4 carbon atoms, nitro, alkoxy of 1 through 4 carbon atoms, alkylthio of 1 through 4 carbon atoms, cyano, or trifluoromethyl, and Z is hydrogen, halogen, methyl, ethyl, nitro, alkoxy of 1 through 4 carbon atoms, or alkylthio of 1 through 4 carbon atoms; and Q is hydrogen, halogen, or methyl.

3. A compound of claim 1 wherein $R_1$ is alkyl of 3 through 6 carbon atoms or cycloalkyl of 5 through 7 carbon atoms;

$R_2$ is methyl;

$R_3$ is $SR_4$ or $OR_4$ where $R_4$ is alkyl of 1 through 6 carbon atoms or alkenyl of 3 through 4 carbon atoms; and X and $X_2$ are oxygen.

4. The compound of claim 1 which is 1-methyl-3-tert-butyl-6-methylthio-s-triazine-2,4(1H,3H)-dione.

5. The compound of claim 1 which is 1-methyl-3-isopropyl-6-methylthio-s-triazine-2,4(1H,3H)-dione.

6. The compound of claim 1 which is 1-methyl-3-cyclohexyl-6-methylthio-s-triazine-2,4(1H,3H)-dione.

7. The compound of claim 1 which is 1-methyl-3-cyclopentyl-6-methylthio-s-triazine-2,4(1H,3H)-dione.

8. The compound of claim 1 which is 1-methyl-3-cyclohexyl-6-ethylthio-s-triazine-2,4(1H,3H)-dione.

9. The compound of claim 1 which is 1-methyl-3-cyclopentyl-6-ethylthio-s-triazine-2,4(1H,3H)-dione.

10. The compound of claim 1 which is 1-methyl-3-cyclopentyl-6-methoxy-s-triazine-2,4(1H,3H)-dione.

11. The compound of claim 1 which is 1-methyl-3-cyclopentyl-6-ethoxy-s-triazine-2,4(1H,3H)-dione.

* * * * *